United States Patent
Yoon (10) Patent No.: US 10,901,737 B2
(45) Date of Patent: Jan. 26, 2021

(54) COMPUTER PROGRAM, METHOD, AND DEVICE FOR DISTRIBUTING RESOURCES OF COMPUTING DEVICE

(71) Applicant: SILCROAD SOFT, INC., Gyeonggi-do (KR)

(72) Inventor: Jeong Il Yoon, Gyeonggi-do (KR)

(73) Assignee: SILCROAD SOFT, INC., Gyeonggi-do (KR)

( * ) Notice: Subject to any disclaimer, the term of this patent is extended or adjusted under 35 U.S.C. 154(b) by 0 days.

(21) Appl. No.: 16/304,347

(22) PCT Filed: Nov. 9, 2017

(86) PCT No.: PCT/KR2017/012682
§ 371 (c)(1),
(2) Date: Nov. 26, 2018

(87) PCT Pub. No.: WO2018/097520
PCT Pub. Date: May 31, 2018

(65) Prior Publication Data
US 2019/0294440 A1    Sep. 26, 2019

(30) Foreign Application Priority Data
Nov. 24, 2016 (KR) .......................... 10-2016-0157491

(51) Int. Cl.
*G06F 9/30* (2018.01)
(52) U.S. Cl.
CPC .................................. *G06F 9/3009* (2013.01)

(58) Field of Classification Search
CPC ........ G06F 11/3612; G06F 9/52; G06F 9/524; G06F 11/3636; G06F 9/3009
See application file for complete search history.

(56) References Cited

U.S. PATENT DOCUMENTS

| | | | |
|---|---|---|---|
| 8,140,823 B2 | 3/2012 | Codrescu | |
| 2002/0129306 A1* | 9/2002 | Flanagan | G06F 9/524 714/100 |
| 2007/0067770 A1* | 3/2007 | Thomasson | G06F 9/52 718/100 |
| 2009/0307704 A1 | 12/2009 | Munshi | |
| 2013/0283101 A1* | 10/2013 | Yang | G06F 11/3612 714/37 |
| 2014/0040519 A1 | 2/2014 | Ur | |

(Continued)

FOREIGN PATENT DOCUMENTS

| | | |
|---|---|---|
| JP | 1078880 | 3/1998 |
| KR | 10-0243679 | 2/2000 |
| KR | 10-0294782 | 7/2001 |

OTHER PUBLICATIONS

Kevin Klues, TOSThreads: Thread-safe and Non-invasive Preemption in TinyOS, ACM Nov. 2009 (Year: 2009).*
Int'l Search Report of PCT/KR2017/012682 dated Feb. 2, 2018.

*Primary Examiner* — Dong U Kim
(74) *Attorney, Agent, or Firm* — Gottlieb, Rackman & Reisman, P.C.

(57) ABSTRACT

A computer program stored in a computer readable storage medium is provided. It includes encoded commands, in which when the computer program is executed by one or more processors of a computer system. The computer program allows the one or more processors to perform certain commands for distributing resources of a computing device.

12 Claims, 6 Drawing Sheets

(56) References Cited

U.S. PATENT DOCUMENTS

| | | | | |
|---|---|---|---|---|
| 2015/0341229 A1* | 11/2015 | Richter | ............... | H04L 43/08 709/224 |
| 2016/0062806 A1* | 3/2016 | Sakada | ............. | G06F 11/0715 718/106 |
| 2016/0124728 A1* | 5/2016 | Mahaffey | ............... | G06F 11/34 717/158 |

* cited by examiner

COMPUTER PROGRAM, METHOD, AND DEVICE FOR DISTRIBUTING RESOURCES OF COMPUTING DEVICE

This application is the U.S. National Stage application of PCT/KR2017/012682.

TECHNICAL FIELD

The present disclosure relates to a method for distributing resources of a computing device, and more particularly, to a method for distributing resources of a computing device by determining a state of a thread.

BACKGROUND ART

A thread means a smallest unit of a computation operation when an internal computation is performed in a process. The computation operation may be execution of a program and an application and a request of a service. The thread is a unit of a data processing process and a core that processes the thread can process two or more threads using a technique such as hyperthreading. According to a program environment, it is possible to process data at a high speed by simultaneously processing two or more threads by multithreading.

When the thread is processed, a computation result of a previous command may be used as input data of a next command. Specifically, when commands having data dependency are consecutively executed, it may be necessary to wait for a result of another command. Data corruption may be prevented by preventing destruction of dependencies between commands due to such data hazard problems or a problem may be solved by utilizing lock when access to a global variable memory should be limited due to a resource problem. When the lock is set with respect to a resource occupied by the thread, data can be prevented from being corrupted or shared by another thread processing, and as a result, the lock is useful in multithread programming.

When multitasking is performed on a multiprocess operating system, since an operation in which data in a processor is changed is performed when a process is switched, a large load is generated in the processor. In this case, data originally on the processor is backed up in a memory or cache and new data is loaded to the processor. Such an operation is referred to as context switching. Since one thread possesses the lock, another thread may not possess the lock until the lock is returned. When another thread obtains the lock, the context switching of the thread occurs and an operation thread is backed up to the cache or memory and after the lock is released, information of another operation thread is backed up again and processed by acquiring the lock. The context switching may generate the large load in the processor and a time required for back-up and loading may be relatively longer than a data processing time. There are various lock methods capable of reducing the load and the processing time of the processor and a research of a method for efficiently processing the thread is required in the art.

Japanese Patent Registration No. JP10078880 illustrates an example of a method for executing a multithread.

Technical Problem

The present disclosure is contrived in response to the background art and has been made in an effort to provide a method for distributing resources of a computing device by determining a state of a thread.

Technical Solution

An embodiment of the present disclosure provides a computer program stored in a computer readable storage medium, which includes a plurality of commands executed by one or more processors of a computing device. The commands may include a determination command to determine, by the thread, when a thread intends to refer to a memory region, whether the memory region is a memory region of a global variable; a lock information verification command to verify, by the thread, lock information of the memory region of the global variable based on determination of whether the memory region is the memory region of the global variable; when the lock information is in a lock setting state, wherein the lock setting state is a state indicating that the memory region is occupied by another thread, a switching command to switch the thread to an active thread or an inactive thread based on a thread state variable without allowing the thread to refer to the memory region; and a command to change the total number of active threads of the thread state variable, wherein the thread state variable is a variable which records the total number of active threads and the total number of inactive threads when the thread is switched to the active thread and change the total number of inactive threads of the thread state variable when the thread is switched to the inactive thread.

Alternatively, the switching command to switch the thread to the active thread or the inactive thread based on the thread state variable may include a command to verify the total number of active threads of the thread state variable, when the total number of active threads is equal to or larger than a predetermined active thread threshold value, a command to switch the thread to the inactive thread, and when the total number of active threads is less than the predetermined active thread threshold value, a command to switch the thread to the active thread.

Alternatively, the predetermined active thread threshold value may be determined according to a load of the processor or determined according to a predetermined ratio based on the sum of the total number of active threads and the total number of inactive threads.

Alternatively, the active thread may be in a free contention state in order to acquire a lock for the memory region of the global variable, and the inactive thread may be in a sleep state in order to save all system resources (CPU).

Alternatively, the commands may further include: when the thread terminates referencing the memory region, a state change command to change the lock information to a lock release state, wherein the lock release state is a state indicating that the memory region is not occupied by another thread; and when the thread terminates referencing the memory region, a command to switch at least some of the inactive threads of the waiting list to the active thread.

Alternatively, a switching order in which each of the inactive threads in the waiting list is switched to the active thread may be an order in which the inactive thread is first recorded in a waiting list or may be redetermined when the thread terminates referencing the memory region.

Alternatively, when the thread terminates referencing the memory region, the command to switch at least some of the inactive threads in the waiting list to the active thread may include an active thread verification command to verify the total number of active threads of the thread state variable, when the total number of active threads verified by the active thread verification command is less than a predetermined active thread threshold value, a command to determine a difference between the predetermined active thread threshold value and the verified total number of active threads, and a command to determine the number of sleep state release state of the inactive threads which are released from a sleep state based on the difference between the predetermined active thread threshold value and the verified total number of active threads and release the sleep state of the inactive threads of the sleep state release number and switch the corresponding inactive threads to the active threads.

Alternatively, when the thread terminates referencing the memory region, the command to switch at least some of the inactive threads in the waiting list to the active thread may include an active thread verification command to verify the total number of active threads of the thread state variable, a command to release the sleep state of a first inactive thread in the waiting list and switch the first inactive thread to the active thread when the total number of active threads verified by the active thread verification command is less than a predetermined active thread threshold value, and a command to switch the first active thread to the active thread and then transfer a sleep state release signal to an inactive thread of a next switching order.

Alternatively, the commands may further include, when the lock information is in a lock release state, a command to allow an active thread that first verifies the lock information among all of the active threads to refer to the memory of the global variable and change the lock information to the lock setting state.

Alternatively, the command may further include, when the lock information is in the lock release state, a state change command to allow the thread to refer to the memory region and change the lock information to the lock setting state.

An embodiment of the present disclosure provides a method for distributing resources of a computing device. The method may include: when a thread intends to refer to a memory region, determining, by the thread, whether the memory region is a memory region of a global variable; verifying, by the thread, lock information of the memory region of the global variable based on determination of whether the memory region is the memory region of the global variable; when the lock information is in a lock setting state, wherein the lock setting state is a state indicating that the memory region is occupied by another thread, switching the thread to an active thread or an inactive thread based on a thread state variable without allowing the thread to refer to the memory region; and changing the total number of active threads of the thread state variable, wherein the thread state variable is a variable which records the total number of active threads and the total number of inactive threads when the thread is switched to the active thread and changing the total number of inactive threads of the thread state variable when the thread is switched to the inactive thread.

An embodiment of the present disclosure provides a device for distributing resources of a computing device. The device may include: a memory; and a processor, when a thread intends to refer to a memory region, determining whether the memory region is a memory region of a global variable, verifying the lock information of the memory region of the global variable based on the determination of whether the memory region is the memory region of the global variable, when the lock information is in a lock setting state, wherein the lock setting state is a state indicating that the memory region is occupied by another thread, switching the thread to an active thread or an inactive thread based on a thread state variable without allowing the thread to refer to the memory region, and changing the total number of active threads of the thread state variable, wherein the thread state variable is a variable which records the total number of active threads and the total number of inactive threads when the thread is determined as the active thread and changing the total number of inactive threads of the thread state variable when the thread is determined as the inactive thread.

Advantageous Effects

According to an embodiment of the present disclosure, a load of a processor can be reduced by efficiently distributing resources of a computing device.

DESCRIPTION OF DRAWINGS

Some of embodiments are illustrated in the accompanying drawings so as to appreciate features of the mentioned disclosed contents with reference to the following embodiments through detailed and more concrete description. Further, it is intended that like reference numerals in the drawing denote the same or similar function throughout several aspects. However, the accompanying drawings just illustrate only specific typical embodiments of the disclosed contents and are not considered to limit the scope of the present disclosure and it should be noted that other embodiments having the same effect can be sufficiently recognized.

BEST MODE

Various embodiments will now be described with reference to drawings. In the present specification, various descriptions are presented to provide appreciation of the present disclosure. However, it is apparent that the embodiments can be executed without the specific description. In other examples, known structures and apparatuses are presented in a block diagram form in order to facilitate description of the embodiments.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication with another system through local and/or remote processing according to a signal (for example, data from one component that interacts with other components and/or data from other systems through a network such as the Internet through a signal in a local system and a distribution system) having one or more data packets, for example.

Moreover, it should be appreciated that the word "comprises" and/or "comprising" means that the corresponding feature and/or component is present, but presence or addition of one or more other features, components, and/or a group thereof is not excluded. Further, when not separately specified or not clear in terms of the context that a singular form is indicated, it should be construed that the singular form generally means "one or more" in the present specification and the claims.

Further, the terms "information" and "data" used in the specification may also be often used to be exchanged with each other.

The objects and effects of the present disclosure, and technical constitutions of accomplishing these will become obvious with reference to embodiments to be described below in detail along with the accompanying drawings. In describing the present disclosure, a detailed description of known function or constitutions will be omitted if it is determined that it unnecessarily makes the gist of the present disclosure unclear. In addition, terms to be described below as terms which are defined in consideration of functions in the present disclosure may vary depending on the intention of a user or an operator or usual practice.

However, the present disclosure is not limited to embodiments disclosed below but may be implemented in various different forms. However, the embodiments are provided to make the present disclosure be complete and completely announce the scope of the present disclosure to those skilled in the art to which the present disclosure belongs and the present disclosure is just defined by the scope of the claims. Accordingly, the terms need to be defined based on contents throughout this specification.

Figure 1:
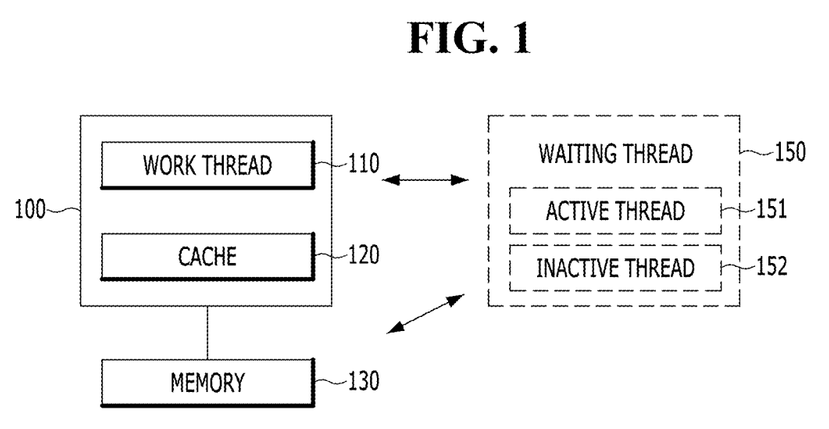
FIG. 1 is a block diagram illustrating a configuration of a device for distributing resources of a computing device according to an embodiment of the present disclosure.

FIG. 1 is a block diagram illustrating a configuration of a device for distributing resources of a computing device according to an embodiment of the present disclosure.

A processor 100 of a device for distributing resources of a computing device according to an embodiment of the present disclosure may include at least one work thread 110 and one cache 120. A memory 130 may be configured separately from the processor 100 and the processor 100 accesses the memory 130 to load or back up data. Further, the device for distributing resources of the computing device may further include an auxiliary storage device, an input device, an output device, and the like, and the devices are not essential components of the device for distributing resources of the computing device, but some devices may be configured to be added or excluded. The device for distributing resources of the computing device may be a digital device including the processor and the memory, such as a desktop computer, a laptop computer, a notebook computer, a server, a mobile phone, a tablet, and the like, and the present disclosure is not limited thereto.

The processor 100 according to an embodiment of the present disclosure may include at least one work thread. The work thread 110 may process an active thread and an inactive thread. The work thread 110 may fetch data required for processing a command of the thread from the cache 120 or memory 130. The work thread 110 may perform data-related computations. The work thread 110 may be paused by a specific command during execution and a processing delay state may occur depending on the processed command of the thread. For example, when waiting for an input of a user, the work thread 110 may be paused and when the input of the user is completed, the work thread 110 may return to an execution waiting state. A processing time of the work thread 110 may be shortened by efficient commands of threads, but it is important to efficiently distribute all system resources (CPU).

According to an embodiment of the present disclosure, the work thread 110 may be a thread on a core of the processor in which the thread is processed. The work thread 110 may process one thread at a time. The multithread may include two or more work threads 110. The work thread 110 may allow the thread to refer to a desired data value under a contention condition situation by obtaining the lock.

According to an embodiment of the present disclosure, when the thread 150 intends to refer to the memory region, the thread 150 may determine whether the memory region is a memory region of a global variable. The thread 150 may verify lock information of the memory region of the global variable based on the determination of whether the memory region is the memory region of the global variable. The thread 150 may occupy or wait for the memory region based on the lock information. The lock information may include a lock setting state indicating that the memory area is occupied by another thread and a lock release state indicating that the memory area is not occupied by another thread. The lock information may be determined to be in a lock setting state when the thread acquires the lock and the lock information may be determined to be in the lock release state when the thread releases the lock.

According to an embodiment of the present disclosure, the thread 150 may acquire the lock and may be processed by the work thread. At least a part of the thread may attempt to acquire the lock in order to refer to the memory of the global variable. The thread may be stored in the cache 120 or stored in the memory 130. The thread may include a unique thread ID, a program counter, a set of registers, a stack, and the like. Further, the thread may share other resources including a code, data, a file, and the like with other threads. The thread 150 may include pointer information which is information indicating the active thread 151 or inactive thread.

According to an embodiment of the present disclosure, the active thread 151 may be a thread that attempts processing in the processor 100 in order to acquire the lock of the work thread 110 among the threads 150. The active thread 151 may be a thread that attempts to access a critical section that is a part of a code associated with a shared resource which two or more work threads should not access simultaneously. The active thread 151 may attempt to acquire the lock along a predetermined instruction loop. The active thread 151 may compete autonomously with another active thread 151 and the active thread 151 that first verifies the lock information from the time when the lock of the memory region to be referenced is released may acquire the lock. Further, the active thread may attempt to acquire the lock in the memory region to be referenced according to a predetermined period, the number of times, a time, and the like. The active thread 151 may not perform context switching to back up and load data in the cache or memory in order to access the critical section within a short time. When the active thread 151 approaches the critical section, the active thread acquires the lock and the remaining active threads may autonomously compete for the lock acquisition.

According to an embodiment of the present disclosure, the inactive thread 152 may be a thread other than the active thread 151 among the threads 150. The inactive thread 152 may be a thread which is in a sleep state in which the processing is not attempted in the processor 100. The sleep state may less occupy the entire system resource than in an active state in which the active thread 151 attempts the lock acquisition. The sleep state may not occupy a system resource. The inactive thread 152 may receive a scheduling support of an operating system and the context switching for the inactive thread 152 may thus occur. At least some of the inactive thread 152, the command, and the data may be backed up in the cache 120 or memory 130 and then, loaded again when the sleep state is released through the contact switching. When a processing time is long or a data amount of the inactive thread 152 is large, backing up the data in the memory 130 rather than the cache may be effective in distribution of the resources. When the sleep state of the inactive thread 152 is released, the active thread 151 may be switched.

According to an embodiment of the present disclosure, the cache 120 may be a cache memory. A copy of data read or written by accessing the memory 130 may be stored in the cache memory. The cache 120 may additionally store a data address of the memory 130. When the work thread 110 refers to the data address of the memory 130 stored in the cache 120, the corresponding data may be immediately transferred to work thread 110. Accordingly, in this case, the work thread 110 may rapidly acquire data without a need of accessing the memory 130. When the data address of the memory 130 stored in the cache 120 is referenced, the corresponding data may be immediately transferred to the thread 150. The cache 120 may include an L1 cache, an L2 cache, and an L3 cache. A type of cache memory is just an example and the present disclosure is not limited thereto.

According to an embodiment of the present disclosure, the memory 130 may store the executed application, the process, the data, the command, the file, and the like. The memory 130 may include a DRAM, an SRAM, a mask ROM, a PROM, an EPROM, an EEPROM, a flash memory, and the like. Further, the memory 130 may store and load a job by using an auxiliary memory device including a virtual memory device. A type of memory is just an example and the present disclosure is not limited thereto.

According to an embodiment of the present disclosure, when the thread 150 completes referring to the memory of the global variable, the thread 150 may release the lock for the memory of the global variable. When the lock is released, other active threads 151 may access the memory of the global variable. The active thread that acquires the lock with respect to the memory of the global variable may be an active thread that first attempts to acquire the lock after the lock is released among active threads which continuously attempt the lock acquisition. The set lock may be released according to a predetermined condition. For example, the lock may be released when the thread is processed by 50% or the lock may be released when there is no association with the critical section that accesses the memory of the global variable. Further, the lock may be released according to a predetermined time condition. The lock release according to such a condition may reduce starvation in which as the thread monopolies the lock, a thread which may not access the resource occurs and reduce a load of the processor. The condition of the lock release is just an example and the present disclosure is not limited thereto.

According to an embodiment of the present disclosure, the inactive thread 152 not selected as the active thread 151 may be changed to the sleep state. The thread 150 may select the inactive thread 152 which is changed to the sleep state. The state may be changed between the active thread 151 and the inactive thread 152 or the states of the active thread 151 and the inactive thread 152 may be exchanged.

According to another embodiment of the present disclosure, some threads among the threads 150 may be determined as the active thread 151 according to a predetermined condition. The predetermined condition may be a condition according to a processing order of the thread 150. The processing order may be determined based on a time order in which the thread 150 enters to be processed in the processor. The active thread 151 and the inactive thread 152 may be determined based on the processing order. The processing order of the thread 150 may be determined based on an importance of the thread 150 or the association between the thread and the memory of the global variable. Further, the processing order of the thread 150 may be determined based on a data capacity or an expected processing time of the thread 150. The processing order may vary depending on the state of the processor 100 or may be reset according to an increase/decrease of the number of threads 150. The processing order is just an example and the present disclosure is not limited thereto.

According to an embodiment of the present disclosure, the thread 150 may be switched to the active thread 151 or the inactive thread 152. When the thread 150 is switched to the active thread 151, the total number of active threads may be written to a thread state variable. When the thread 150 is switched to the inactive thread 152, the total number of inactive threads may be written to the thread state variable. The thread state variable may include writing of the total number of active threads and the total number of inactive threads. The thread 150 may be determined to be switched to the active thread 151 or the inactive thread 152 based on the thread state variable.

In an embodiment of the present disclosure, a determination condition to be switched to the active thread 151 or the inactive thread 152 may be determined by verifying the total number of active threads of the thread state variable. When the total number of active threads is equal to or larger than a predetermined active thread threshold value, the thread may be switched to the inactive thread. Further, when the total number of active threads is smaller than a predetermined active thread threshold value, the thread may be switched to the inactive thread. The thread state variable may be stored in at least one of the cache 120 and the memory 130. The thread state variable may be written if at least one of the number of active threads and the number of inactive threads varies. The thread state variable may be updated periodically or according to a predetermined method.

In an embodiment of the present disclosure, the threshold value of the predetermined active thread may be determined according to the load of the processor or may be determined according to a predetermined ratio based on the sum of the total number of active threads and the total number of inactive threads. For example, when a ratio of the total number of active threads to the total number of inactive threads is predetermined to be 3:7, a thread that newly accesses the memory of the global variable to acquire the lock may be determined as the inactive thread when the number of active threads is equal to or more than 3/10 of the total number of threads. Further, when the number of active threads is large and the load of the processor exceeds the predetermined threshold value, the thread newly accessing the memory of the global variable to acquire the lock may be determined as the inactive thread. The threshold value of the thread is just an example and the present disclosure is not limited thereto.

According to an embodiment of the present disclosure, the active thread 151 may be in a free contention state to obtain the lock for the memory region of the global variable. The inactive thread 152 may be in the sleep state in order to save all system resources. The active thread 151 is switched to the inactive thread 152 to be in the sleep state. When the number of active threads 151 varies, the inactive thread 152 may be released from the sleep state based on a use amount of the processor and may be switched to the active thread 151. When the use amount of the processor is smaller than a predetermined value, the number of active threads that attempt processing in the work thread 110 is increased to allow more active threads to attempt the lock acquisition for the memory of the global variable, thereby effectively distributing all system resources. Additionally, when the use amount of the processor is smaller than the predetermined value, the active thread 151 may increase a frequency of attempting the lock acquisition for the memory of the global variable. In this case, a delay time required for the lock acquisition is reduced to more rapidly acquire the lock.

According to an embodiment of the present disclosure, when the thread is switched to the inactive thread to be in the sleep state, the processor 100 may write an ID of the thread to a waiting list. When the thread terminates referencing the memory region, the processor 100 may change the lock information to a lock release state. Further, when the thread terminates referencing the memory region, the processor 100 may switch at least a part of the inactive thread in the waiting list to the active thread. The waiting list may be present in at least one of the memory and the cache. The waiting list may be a variable value, a pointer, an array, or the lie, but the present disclosure is not limited thereto. When the thread 150 completes referencing the memory of the global variable and the lock is thus released, the use amount of the processor may vary or may be reduced. Therefore, when the lock is released, at least some of the inactive threads 152 may be released from the sleep state. Further, when the active thread 151 acquires the lock or is changed to the inactive thread 152, the number of active threads 151 may vary. By reduction of the number of active threads 151, the inactive thread 152 is released from the sleep state and selected as the active thread 151, and as a result, the number of active threads 151 may be maintained. The active thread 151 released from the sleep state may also attempt to acquire the lock for the memory of the global variable. The active thread 151 released from the sleep state may attempt to acquire the lock through autonomous contention like another active thread. In addition, when a lock acquisition order of the active thread 151 is predetermined, the lock acquisition order of the active thread 151 released from the sleep state may be determined according to a predetermined condition.

According to an embodiment of the present disclosure, the total number of active threads 151 is variable and may be determined as a predetermined threshold value of the active thread. The number of active threads 151 may be determined according to performance of the processor. The number of threads which are released from the sleep state may be determined based on a processing state of the processor 100 or determined according to the load of the processor. The number of threads released from the sleep state may be the number of active threads 151, which is smaller than the predetermined threshold value in order to maintain the predetermined number of active threads 151.

According to an embodiment of the present disclosure, when the thread 150 is switched to the inactive thread 152 to be changed to the sleep state, the total number of active threads 151 may be determined based on a context switching time at which data is exchanged between the memory and the inactive thread 152. When the context switching time is longer than the processing time, attempting the processing in the processor 100 while rounding a predetermined loop with the active thread may be better than changing the thread 150 to the inactive thread 152. The threads 150 of which processing time is short may not be switched to the inactive thread 152 but to the active thread 151.

According to an embodiment of the present disclosure, when the thread 150 is switched to the inactive thread, the processor 100 may write the ID of the thread to the waiting list. A switching order in which each of the inactive threads in the waiting list is switched to the active thread may be an order in which the inactive threads are first written to the waiting list. Further, the switching order may be reset when the thread terminates referencing the memory region. For example, a first thread is switched to the inactive thread and the ID of the first thread may be thus written to the waiting list and the second thread is then switched to the inactive thread and the ID of the second thread may be thus written to the waiting list. In this case, the first thread may be released from the sleep state and the second thread may be then released from the sleep state. The switching order in which the inactive thread is switched to the active thread is just an example and the present disclosure is not limited thereto.

According to an embodiment of the present disclosure, when the thread 150 terminates referencing the memory region, the processor 100 may switch at least some of the threads in the waiting list to the active thread. In this case, the thread 150 may first verify the total number of active threads of the thread state variable. When the total number of active threads is less than a predetermined active thread threshold value, the thread 150 may determine a difference between the threshold value and the verified total number of active threads. The thread 150 may determine a sleep state release number of inactive threads which are released from the sleep state based on the difference between the predetermined active thread threshold value and the verified total number of active threads and release the sleep state of the inactive threads of the sleep state release number and switch the corresponding inactive threads to the active threads. In this case, all inactive threads which are released from the sleep state may be released from the sleep state by receiving a release signal from the same target. The thread 150 may determine a state of the thread by calling a predetermined function. The thread 150 performs the computation for the thread 150 based on the function by calling the predetermined function to allow the thread to perform the aforementioned operations.

According to another embodiment of the present disclosure, when the thread 150 terminates referencing the memory region, the processor 100 may switch at least some of the inactive threads in the waiting list to the active thread. In this case, the inactive thread 152 may first verify the total number of active threads of the thread state variable. When the total number of active threads is less than the predetermined active thread threshold value, a first inactive thread in the waiting list may be released from the sleep state and switched to the active thread. The first inactive thread may transfer a sleep state release signal to the inactive thread of a next switching order, which is switched to the active thread. The inactive thread that receives the release signal may be released from the sleep state and may transfer the sleep state release signal to the inactive thread of the next switching order. The release signal may be repeatedly transferred and the repetition number may be determined based on a difference between the predetermined active thread threshold value and the verified total number of active threads. That is, inactive threads of a number which is as large as the difference may be sequentially released from the sleep state and switched to the active threads. The thread 150 may determine the state of the thread by calling the predetermined function. The thread 150 performs the computation for the thread 150 based on the function by calling the predetermined function to allow the thread to perform the aforementioned operations.

According to an embodiment of the present disclosure, when the lock information is in a lock release state, an active thread that first verifies the lock information among all of the active threads is allowed to refer to the memory of the global variable and the lock information may be changed to a lock setting state. When the lock information is changed to the lock setting state, another active thread may not be allowed to refer to the memory of the global variable. Further, when the lock information is in the lock release state, the thread that attempts to acquire the lock may refer to the memory region and may change the lock information to the lock setting state.

Figure 2:
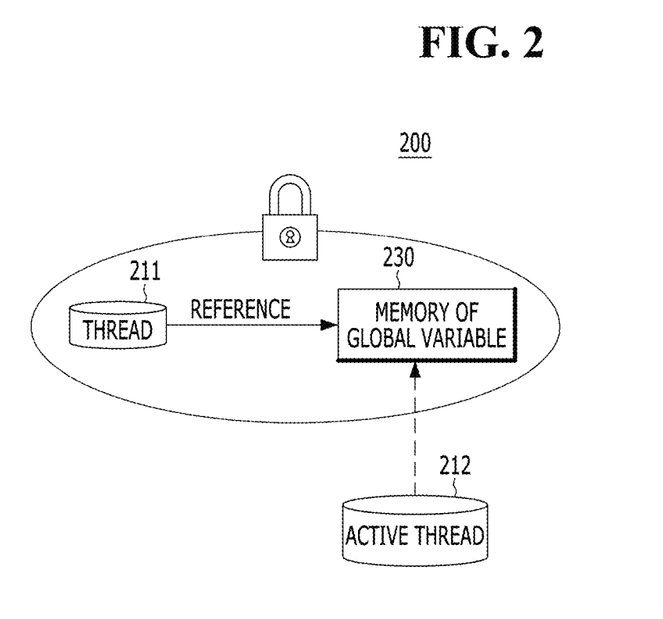
FIG. 2 is an exemplary diagram in which a thread acquires a lock and an active thread attempts referring to a memory of a global variable according to an embodiment of the present disclosure.

FIG. 2 is an exemplary diagram in which a thread acquires a lock and an active thread attempts referring to a memory of a global variable according to an embodiment of the present disclosure.

According to an embodiment of the present disclosure, a thread 211 is switched to an active thread 212 and an inactive thread such that the active thread operates in a spinlock scheme and the inactive thread operates in a semaphore scheme. According to an aspect of the present disclosure, all of the threads may be in the sleep state or in an active state and may be in a mixed state of the sleep state and the active state. The spinlock scheme consumes a lot of processor resources, but the spinlock scheme may be worked quickly for some conditional threads. For example, a thread that is expected to have a processing time of less than 1 ms in the processor may operate in the spinlock scheme. The semaphore scheme consumes less processor resources, but context switching for inactive threads may occur and the processing time may be delayed. The thread may be switched to the inactive thread according to a predetermined condition. For example, when all of the threads operate in the spinlock scheme, system resources may be insufficient. Therefore, when a thread quantity exceeds a predetermined quantity, at least some threads may be switched to the active thread and may operate in the spinlock scheme and the remaining threads are switched to the inactive thread and may operate in the semaphore in order to save all system resources (CPU).

According to an embodiment of the present disclosure, at least some of the threads 211 may be switched to the inactive thread so as not to compete to acquire the lock in a memory 230 of the global variable. The inactive thread may be in the sleep state. The sleep state and the active state in which the sleep state is released may be managed by an object which is related to the lock setting. The active state may be controlled by an operation related to the lock setting. It is known that the operation in the spinlock scheme is more efficient than the operation in the semaphore scheme, but the spinlock scheme continuously preoccupies the resource, and as a result, as threads that attempt to acquire the lock are more, an overload may be applied to the processor. In this case, when a threshold value for the overload is exceeded, the processor may experience rapid performance degradation and starvation may occur. Therefore, according to an aspect of the present disclosure, spinlock and semaphore lock are mixedly used to effectively distribute all system resources (CPU).

Figure 3:
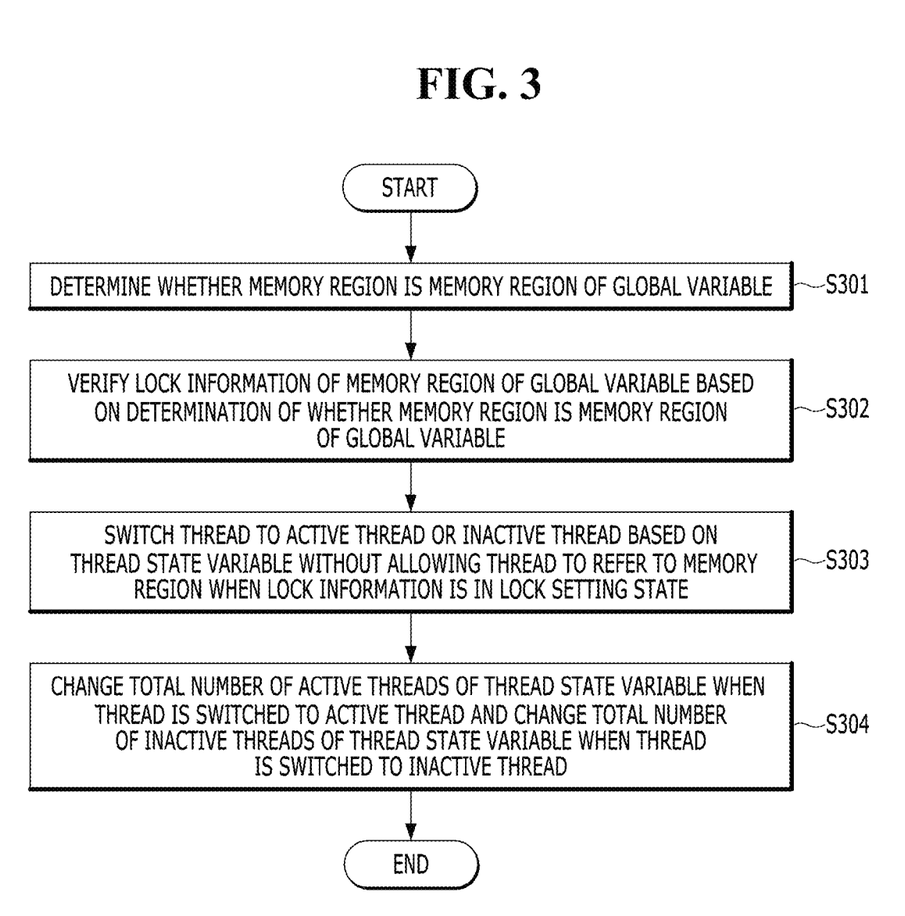
FIG. 3 is a flowchart illustrating a method for distributing resources of a computing device according to an embodiment of the present disclosure.

FIG. 3 is a flowchart illustrating a method for distributing resources of a computing device according to an embodiment of the present disclosure.

According to an embodiment of the present disclosure, the method for distributing resources of a computing device may include steps to be described below. When the thread intends to refer to the memory region, the processor may allow the thread to determine whether the memory region is the memory region of the global variable (S301). The processor may allow the thread to verify the lock information of the memory region of the global variable based on the determination of whether the memory region is the memory region of the global variable (S302). When the lock information is in the lock setting state being a state indicating that the memory region is occupied by another thread, the processor may not allow the thread to refer to the memory region, but may switch the thread to the active thread or inactive thread based on the thread state variable (S303). When the thread is switched to the active thread, the processor may change the total number of active threads of the thread state variable of the thread state variable being a variable which records the total number of active threads and the total number of inactive threads, and when the thread is switched to the inactive thread, the processor may change the total number of inactive threads of the thread state variable (S304).

According to an embodiment of the present disclosure, when the thread terminates referencing the memory region, the lock information may be changed to the lock release state being a state indicating that the memory region is not occupied by another thread. Further, when the thread terminates referencing the memory region, the processor 100 may switch at least some of the inactive threads in the waiting list to the active thread.

Figure 4:
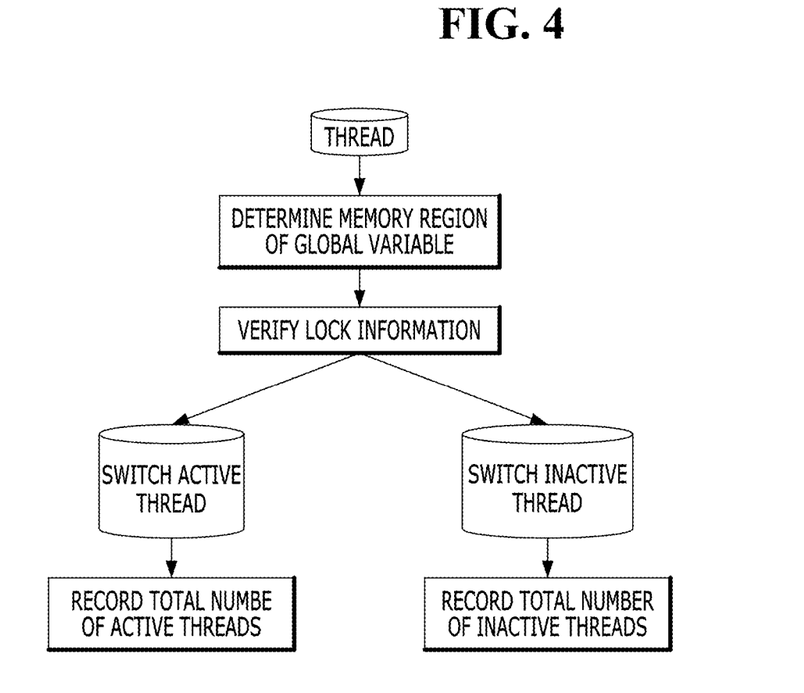
FIG. 4 is a conceptual diagram illustrating a method for determining a state of a thread by a processor according to an embodiment of the present disclosure.

FIG. 4 is a conceptual diagram illustrating a method for determining a state of a thread by a processor according to an embodiment of the present disclosure.

According to an embodiment of the present disclosure, when the thread intends to refer to the memory region, the processor may determine whether the memory region of the thread is the memory region of the global variable. The processor may verify the lock information of the memory region of the global variable based on the determination of whether the memory region of the thread is the memory region of the global variable. When the lock information is in the lock setting state, the processor may verify the total number of active threads of the thread state variable without allowing the thread to reference the memory region. When the total number of active threads is equal to or larger than a predetermined active thread threshold value, the processor may switch the thread to the inactive thread. When the thread is switched to the inactive thread, the processor may record the changed total number of inactive threads in the thread state variable. Further, when the total number of active threads is less than the predetermined active thread threshold value, the processor may switch the thread to the active thread. When the thread is switched to the active thread, the processor may record the changed total number of active threads in the thread state variable.

Figure 5:
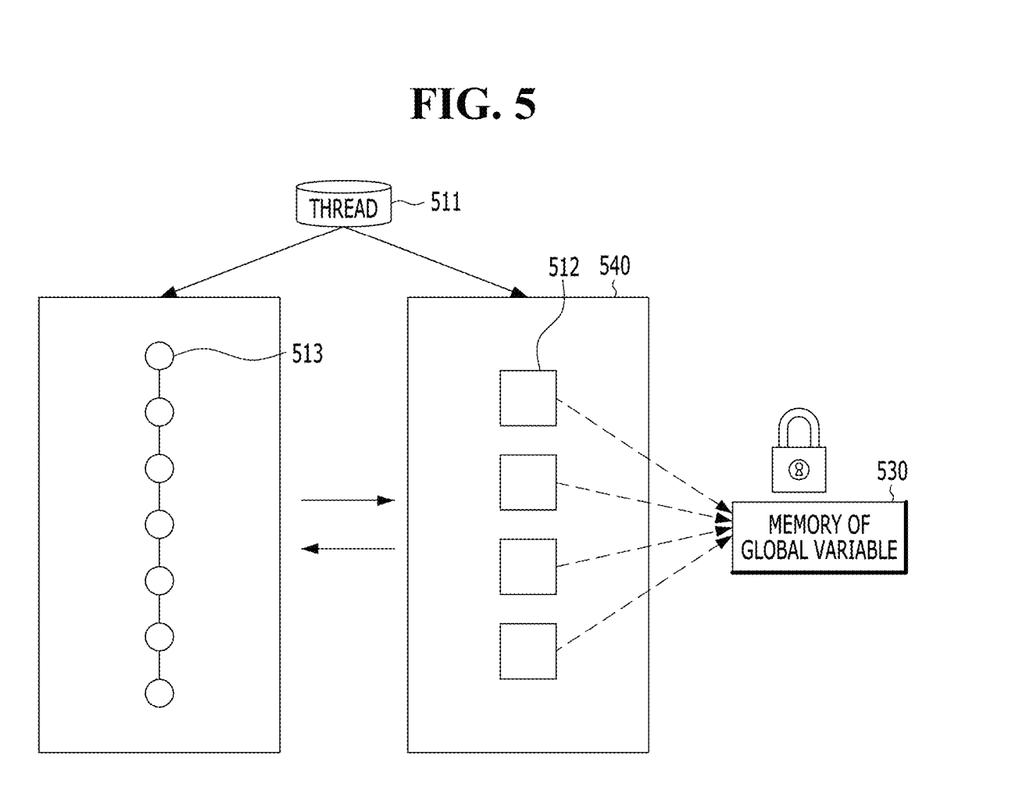
FIG. 5 is an exemplary diagram illustrating a method for distributing resources of an inactive thread and a computing device having a switching order according to another embodiment of the present disclosure.

FIG. 5 is an exemplary diagram illustrating a method for distributing resources of an inactive thread and a computing device having a switching order according to another embodiment of the present disclosure.

According to another embodiment of the present disclosure, the switching order of the inactive threads may be an order in which the inactive threads are first written to the waiting list. Further, an active thread 512 and an inactive thread 513 may be determined based on a predetermined active thread threshold value and the current number of active threads 512. The number of active threads 512 may be variable and may be controlled by the threshold value. The processing order of the threads 511 may be changed according to a predetermined condition.

According to another embodiment of the present disclosure, the switching order of at least one of the active thread and the inactive thread may be predetermined. The switching order may be determined based on the waiting list. The waiting list may be a space in which the inactive thread 513 is present. The ID of the inactive thread may be recorded in the waiting list. A lock acquisition order of the active thread may be an order of first attempting the lock acquisition in the memory from the moment when the lock of the global variable is released. The lock acquisition order of the active thread may be determined based on a load capacity of the active thread in the processor. Further, the lock acquisition order may be determined based on an expected processing time of the active thread in the processor. In addition, the lock acquisition order may be determined to maintain a predetermined range of processing speed and determined to maintain a predetermined range of load of another processor. The active thread that acquires the lock may be processed by the work thread and at the moment when the processing is completed, at least some of the inactive threads may be released from the sleep state again. The sleep-released inactive threads may be changed to the active threads.

According to another embodiment of the present disclosure, the inactive thread 513 may first verify the total number of active threads of the thread state variable. When the total number of active threads is less than the predetermined active thread threshold value, a first inactive thread in the waiting list may be released from the sleep state and switched to the active thread. The first inactive thread may transfer a sleep state release signal to the inactive thread of a next switching order, which is switched to the active thread. The inactive thread that receives the release signal may be released from the sleep state and may transfer the sleep state release signal to the inactive thread of the next switching order. The release signal may be repeatedly transferred and the repetition number may be determined based on a difference between the predetermined active thread threshold value and the verified total number of active threads. That is, inactive threads of a number which is as large as the difference may be sequentially released from the sleep state and switched to the active threads. The thread 511 may determine the state of the thread by calling the predetermined function. The thread 511 performs the computation for the thread 511 based on the function by calling the predetermined function to allow the thread to perform the aforementioned operations.

Figure 6:
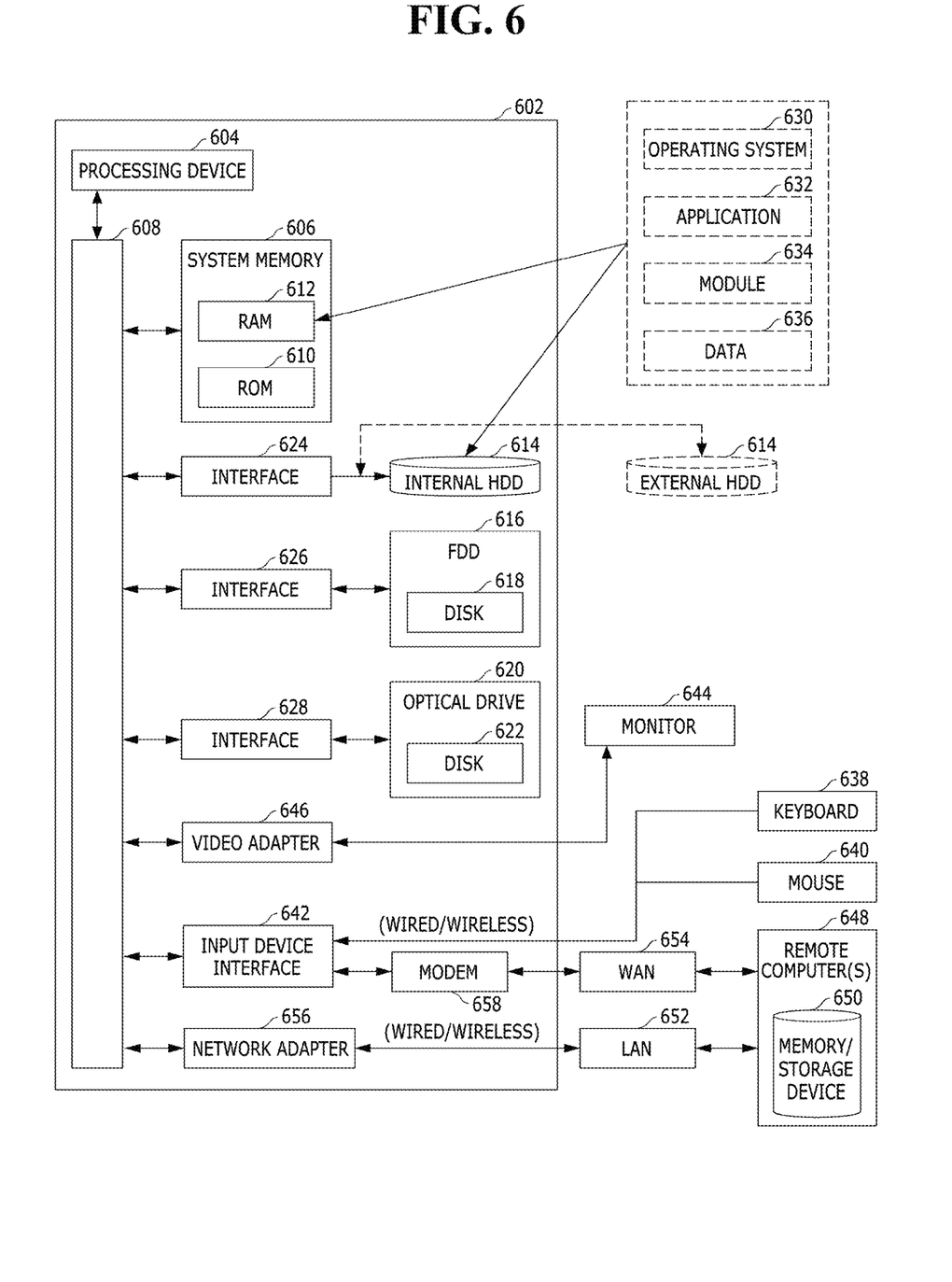
FIG. 6 is a simple and normal schematic view of an exemplary computing environment in which embodiments of the present disclosure may be implemented.

FIG. 6 illustrates a simple and general schematic view of an exemplary computing environment in which the embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include computer storage media. The computer storage media include volatile and non-volatile, temporary or non-temporary, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

An exemplary environment 600 that implements various aspects of the present disclosure including a computer 602 is shown and the computer 602 includes a processing device 604, a system memory 606, and a system bus 608. The system bus 608 connects system components including the system memory 606 (not limited thereto) to the processing device 604. The processing device 604 may be a predetermined processor among various commercial processors. A dual processor or other multi-processor architectures may also be used as the processing device 604.

The system bus 608 may be any one of several types of bus structures which may be additionally interconnected to a local bus using any one of a memory bus, a peripheral device bus, and various commercial bus architectures. The system memory 606 includes a read only memory (ROM) 610 and a random access memory (RAM) 612. A basic input/output system (BIOS) is stored in the non-volatile memories 610 including the ROM, the EPROM, the EEPROM, and the like and the BIOS includes a basic routine that assists in transmitting information among components in the computer 602 at a time such as in-starting. The RAM 612 may also include a high-speed RAM including a static RAM for caching data, and the like.

The computer 602 also includes an internal hard disk drive (HDD) 614 (for example, EIDE and SATA)—the internal hard disk drive (HDD) 614 may also be configured for an external purpose in an appropriate chassis (not illustrated)—, a magnetic floppy disk drive (FDD) 616 (for example, for reading from or writing in a mobile diskette 618), and an optical disk drive 620 (for example, for reading a CD-ROM disk 622 or reading from or recorded in other high-capacity optical media such as the DVD). The hard disk drive 614, the magnetic disk drive 616, and the optical disk drive 620 may be connected to the system bus 608 by a hard disk drive interface 624, a magnetic disk drive interface 626, and an optical drive interface 628, respectively. An interface 624 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 602, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 630, one or more application programs 632, other program module 634, and program data 636 may be stored in the drive and the RAM 612. All or some of the operating system, the application, the module, and/or the data may also be cached by the RAM 612. It will be well appreciated that the present disclosure may be implemented in operating systems which are commercially usable or a combination of the operating systems.

A user may input commands and information in the computer 602 through one or more wired/wireless input devices, for example, pointing devices such as a keyboard 638 and a mouse 640. Other input devices (not illustrated) may include a microphone, an IR remote controller, a joystick, a game pad, a stylus pen, a touch screen, and others. These and other input devices are often connected to the processing device 604 through an input device interface 6142 connected to the system bus 608, but may be connected by other interfaces including a parallel port, an IEEE 1394 serial port, a game port, a USB port, an IR interface, and others.

A monitor 644 or other types of display devices are also connected to the system bus 608 through interfaces such as a video adapter 646, and the like. In addition to the monitor 644, the computer generally includes a speaker, a printer, and other peripheral output devices (not illustrated).

The computer 602 may operate in a networked environment by using a logical connection to one or more remote computers including remote computer(s) 648 through wired and/or wireless communication. The remote computer(s) 648 may be a workstation, a server computer, a router, a personal computer, a portable computer, a micro-processor based entertainment apparatus, a peer device, or other general network nodes and generally includes multiple components or all of the components described with respect to the computer 602, but only a memory storage device 650 is illustrated for brief description. The illustrated logical connection includes a wired/wireless connection to a local area network (LAN) 652 and/or a larger network, for example, a wide area network (WAN) 654. The LAN and WAN networking environments are general environments in offices and companies and facilitate an enterprise-wide computer network such as Intranet, and all of them may be connected to a worldwide computer network, for example, the Internet.

When the computer 602 is used in the LAN networking environment, the computer 602 is connected to a local network through a wired and/or wireless communication network interface or an adapter 656. The adapter 656 may facilitate the wired or wireless communication to the LAN 652 and the LAN 652 also includes a wireless access point installed therein in order to communicate with the wireless adapter 656. When the computer 602 is used in the WAN networking environment, the computer 602 may include a modem 658, is connected to a communication server on the WAN 654, or has other means that configure communication through the WAN 654 such as the Internet, etc. The modem 658 which may be an internal or external and wired or wireless device is connected to the system bus 608 through the serial port interface 642. In the networked environment, the program modules described with respect to the computer 602 or some thereof may be stored in the remote memory/storage device 650. It will be well known that illustrated network connection is exemplary and other means configuring a communication link among computers may be used.

The computer 602 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as a device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Further, various embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" include a wireless channel and various other media that can store, possess, and/or transfer command(s) and/or data, but are not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented embodiments is provided so that those skilled in the art of the present disclosure use or implement the present disclosure. Various modifications of the embodiments will be apparent to those skilled in the art and general principles defined herein can be applied to other embodiments without departing from the scope of the present disclosure. Therefore, the present disclosure is not limited to the embodiments presented herein, but should be analyzed within the widest range which is consistent with the principles and new features presented herein.

MODE FOR INVENTION

Related contents in the best mode for carrying out the present disclosure are described as above.

INDUSTRIAL APPLICABILITY

The present disclosure relates to a method for distributing resources of a computing device, and more particularly, may provide a method for distributing resources of a computing device by determining a state of a thread.

The invention claimed is:

1. A non-transitory computer-readable medium, which includes encoded commands, wherein when a computer program stored in the non-transitory computer-readable medium is executed by one or more processors of a computer system, the computer program which allows the one or more processors to perform the following commands for distributing resources of a computing device, the commands comprising:
 a determination command to determine, by a thread, when the thread intends to refer to a memory region, whether the memory region is a memory region of a global variable;
 a lock information verification command to verify, by the thread, lock information of the memory region of the global variable based on determination of whether the memory region is the memory region of the global variable;
 when the lock information of the memory region of the global variable is in a lock setting state, wherein the lock setting state is a state indicating that the memory region is occupied by another thread, a switching command to switch the thread to an active thread or an inactive thread based on a thread state variable without allowing the thread to refer to the memory region of the global variable; and
 a command to change a total number of active threads of the thread state variable, wherein the thread state variable is a variable which records the total number of active threads and a total number of inactive threads, when the thread is switched to the active thread and change the total number of inactive threads of the thread state variable when the thread is switched to the inactive thread.

2. The non-transitory computer-readable medium of claim 1, wherein the switching command to switch the thread to the active thread or the inactive thread based on the thread state variable includes
 a command to verify the total number of active threads of the thread state variable,
 a command to switch the thread to the inactive thread when the total number of active threads is equal to or larger than a predetermined active thread threshold value, and
 a command to switch the thread to the active thread when the total number of active threads is less than the predetermined active thread threshold value.

3. The non-transitory computer-readable medium of claim 2, wherein the predetermined active thread threshold value
 is determined according to a load of the processor or
 is determined according to a predetermined ratio based on the sum of the total number of active threads and the total number of inactive threads.

4. The non-transitory computer-readable medium of claim 1, wherein the active thread is in a free contention state in order to acquire a lock for the memory region of the global variable, and
 wherein the inactive thread is in a sleep state in order to save all system resources (CPU).

5. The non-transitory computer-readable medium of claim 1, wherein the commands further include:
 a state change command to change the lock information to a lock release state wherein the lock release state is a state indicating that the memory region is not occupied by another thread when the thread terminates referencing the memory region; and a command to switch at least some of the inactive threads of a waiting list to the active threads when the thread terminates referencing the memory region.

6. The non-transitory computer-readable medium of claim 5, wherein a switching order in which each of the inactive threads in the waiting list is switched to the active threads
is an order in which the inactive thread is first recorded in the waiting list or
is redetermined when the thread terminates referencing the memory region.

7. The non-transitory computer-readable medium of claim 5, wherein the command to switch at least some of the inactive threads in the waiting list to the active thread when the thread terminates referencing the memory region includes
an active thread verification command to verify the total number of active threads of the thread state variable,
a command to determine, when the total number of active threads verified by the active thread verification command is less than a predetermined active thread threshold value, a difference between the predetermined active thread threshold value and the verified total number of active threads, and
a command to determine a sleep state release number of inactive threads which are released from a sleep state based on the difference between the predetermined active thread threshold value and the verified total number of active threads and release the sleep state of the inactive threads of the sleep state release number and switch the corresponding inactive threads to the active threads.

8. The non-transitory computer-readable medium of claim 5, wherein the command to switch at least some of the inactive threads in the waiting list to the active thread when the thread terminates referencing the memory region includes:
an active thread verification command to verify the total number of active threads of the thread state variable,
a command to release, when the total number of active threads verified by the active thread verification command is less than a predetermined active thread threshold value, a sleep state of a first inactive thread in the waiting list and switch the first inactive thread to the active thread, and
a command to switch the first inactive thread to the active thread and then transfer a sleep state release signal to an inactive thread of a next switching order.

9. The non-transitory computer-readable medium of claim 1, wherein the commands further include:
a command to allow, when the lock information is in a lock release state, an active thread that first verifies the lock information among all of the active threads to refer to the memory region of the global variable and change the lock information to the lock setting state.

10. The non-transitory computer-readable medium of claim 1, wherein the commands further include:
a state change command to allow the thread to refer to the memory region and change the lock information to the lock setting slate, when the lock information is in the lock release state.

11. A method for distributing resources of a computing device, the method comprising:
determining, when a thread intends to refer to a memory region, by the thread, whether the memory region is a memory region of a global variable;
verifying, by the thread, lock information of the memory region of the global variable based on determination of whether the memory region is the memory region of the global variable;
switching, when the lock information of the memory region of the global variable is in a lock setting state, wherein the lock setting state is a state indicating that the memory region is occupied by another thread, the thread to an active thread or an inactive thread based on a thread state variable without allowing the thread to refer to the memory region of the global variable; and
changing a total number of active threads of the thread state variable, wherein the thread state variable is a variable which records the total number of active threads and a total number of inactive threads when the thread is switched to the active thread and changing the total number of inactive threads of the thread state variable when the thread is switched to the inactive thread.

12. A device for distributing resources of a computing device, the device comprising:
a memory; and
a processor determining, when a thread intends to refer to a memory region, whether the memory region is a memory region of a global variable,
verifying a lock information of the memory region of the global variable based on the determination of whether the memory region is the memory region of the global variable,
switching, when the lock information of the memory region of the global variable is in a lock setting state, wherein the lock setting state is a state indicating that the memory region is occupied by another thread, the thread to an active thread or an inactive thread based on a thread state variable without allowing the thread to refer to the memory region of the global variable, and
changing a total number of active threads of the thread state variable, wherein the thread state variable is a variable which records the total number of active threads and a total number of inactive threads when the thread is switched to the active thread and changing the total number of inactive threads of the thread state variable when the thread is determined as the inactive thread.

* * * * *